United States Patent
Jacobson et al.

(10) Patent No.: US 9,327,588 B2
(45) Date of Patent: May 3, 2016

(54) CONTROLLING A DRIVE SYSTEM HAVING A PLANETARY GEAR SET

(75) Inventors: Evan Earl Jacobson, Edwards, IL (US); Yanchai Zhang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 989 days.

(21) Appl. No.: 13/469,778

(22) Filed: May 11, 2012

(65) Prior Publication Data

US 2013/0303333 A1    Nov. 14, 2013

(51) Int. Cl.
*B60W 30/188* (2012.01)
*B60K 6/12* (2006.01)
*B60K 6/48* (2007.10)

(52) U.S. Cl.
CPC ... *B60K 6/12* (2013.01); *B60K 6/48* (2013.01); *B60W 30/188* (2013.01); *B60K 2006/4833* (2013.01); *B60W 2710/1005* (2013.01); *B60W 2710/1011* (2013.01); *B60W 2710/1022* (2013.01); *B60W 2720/10* (2013.01); *Y02T 10/6208* (2013.01); *Y02T 10/6221* (2013.01); *Y02T 10/6282* (2013.01); *Y02T 10/7258* (2013.01); *Y10T 477/688* (2015.01)

(58) Field of Classification Search
None
See application file for complete search history.

(56) References Cited

U.S. PATENT DOCUMENTS

| 5,168,946 A | 12/1992 | Dorgan |
| 8,414,440 B2 * | 4/2013 | Tiwari et al. .................. 475/151 |
| 2011/0040435 A1 * | 2/2011 | Gillecriosd .................... 701/22 |

FOREIGN PATENT DOCUMENTS

JP    2008-247269    10/2008

* cited by examiner

*Primary Examiner* — Erin D Bishop
(74) *Attorney, Agent, or Firm* — Finnegan, Henderson, Farabow, Garrett & Dunner, LLP

(57) ABSTRACT

A method of controlling a drive system includes receiving a machine travel speed request, and determining an output speed of a variator, associated with the drive system, required to satisfy the travel speed request at a current power source speed. The method also includes determining that a storage device operably connected to the variator has an amount of stored energy sufficient to operate the variator at the variator output speed, and providing torque to a machine transmission with a machine power source and the variator. The variator is operated at the variator output speed using stored energy from the storage device to provide torque to the transmission. The torque provided to the transmission with the power source and the variator is sufficient to satisfy the travel speed request at the current power source speed.

18 Claims, 6 Drawing Sheets

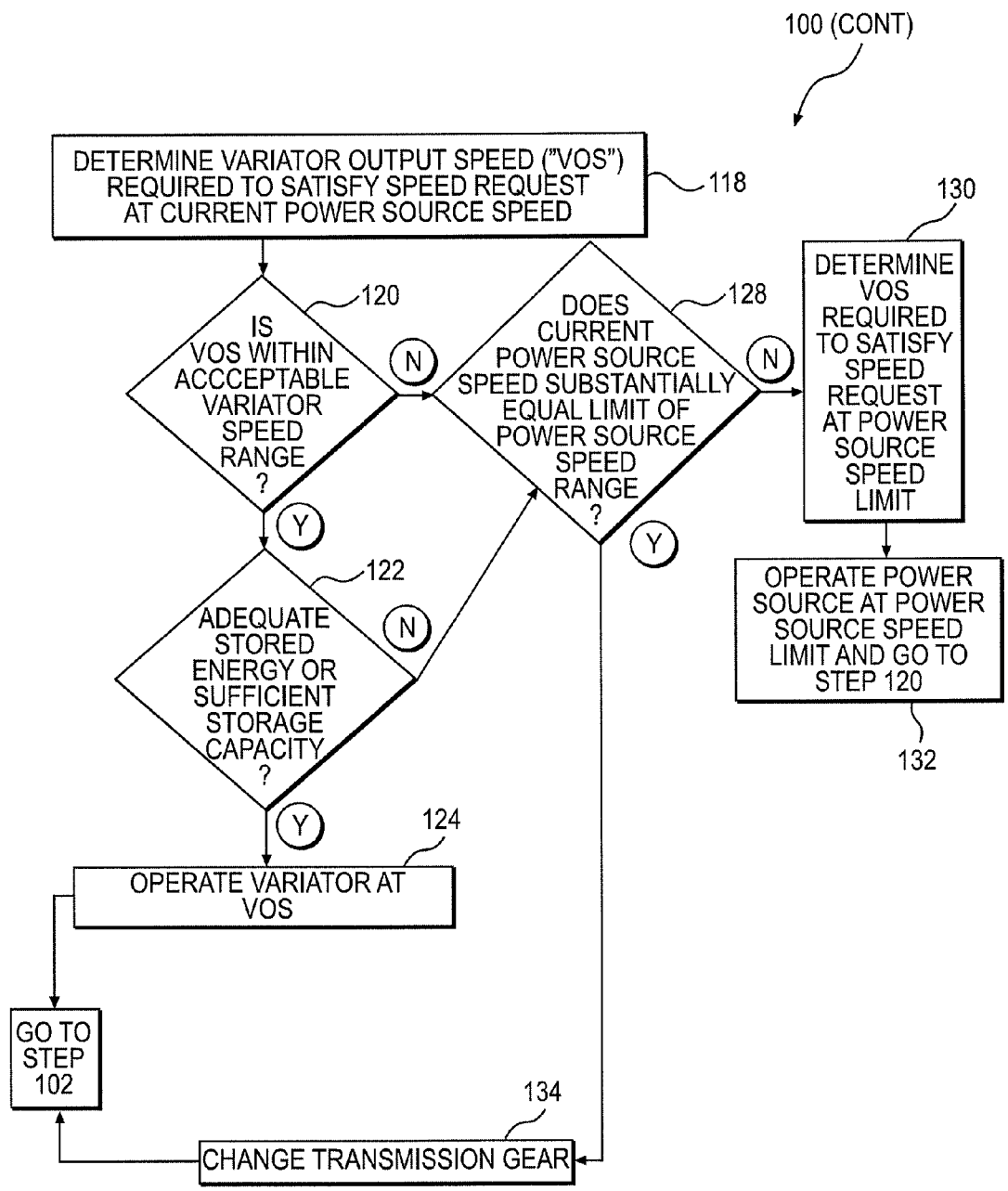
*FIG. 5-CONT.*

CONTROLLING A DRIVE SYSTEM HAVING A PLANETARY GEAR SET

TECHNICAL FIELD

The present disclosure relates generally to a drive system and, more particularly, to drive system having a planetary gear set.

BACKGROUND

Machines, such as, for example, track-type tractors and other construction, agriculture, and mining machines, are used to perform many tasks. To effectively perform these tasks, such machines require a power source that provides significant power to a drive system. The power source may be an engine such as, for example, a turbine engine, diesel engine, gasoline engine, or natural gas engine operated to generate a torque output at a range of speeds. This torque is typically provided to one or more traction devices via a transmission operably connected to the engine via the drive system.

To assist the transmission and the engine in satisfying the varying requests of the traction devices during use, the drive systems of such machines typically include one or more motors, torque converters, or other like devices configured to supply supplemental torque to the transmission in certain situations. For example, such drive system components may be configured to supplement the torque provided by the engine during machine operations in which wide, relatively rapid variations in the transmission output speed are required.

An exemplary drive system is described in U.S. Pat. No. 5,168,946 (the '946 patent) issued to Dorgan on Dec. 8, 1992. The '946 patent describes an electric drive system having first, second, and third electric motors connected via left and right combining gear sets to respective left and right vehicle tracks. To propel the vehicle in low range operations (e.g., low speed, high torque), the first and second motors are energized, while the a brake is applied to the third motor. To propel the vehicle in high range operations (e.g., high speed, low torque), all three motors are energized. As explained in the '946 patent, the use of three motors, rather than two, in high range operations results in a reduction of motor sizes.

Although the drive system disclosed in the '946 patent may be used to propel the vehicle in a number of operating ranges, drive systems of the type disclosed in the '946 patent have a variety of drawbacks. For example, in order to account for occasional high-torque and/or high power loading situations, the motors and/or other components of such drive systems are typically oversized for a majority of the machine operation. In addition to the high cost of such components, and the related packaging issues, operation of these oversized drive system components during low-torque loading conditions is inefficient. Moreover, such components are known to be inefficient due to the torque losses associated with their operation. Additionally, such components are not configured to facilitate the storage of energy received from the transmission and/or the engine during operations in which, for example, excess torque has been generated by the engine. Instead, such known drive system components typically transform such excess energy to heat. Over time, such heat generation can cause damage to these drive system components, and may result in their premature failure.

The disclosed systems and methods are directed to overcoming one or more of the problems set forth above.

SUMMARY OF THE INVENTION

In an exemplary embodiment of the present disclosure, a method of controlling a drive system operably connected to a power source and a transmission of a machine includes receiving a machine travel speed request, and determining an output speed of a variator, associated with the drive system, required to satisfy the travel speed request at a current power source speed. The method also includes determining that a storage device operably connected to the variator has an amount of stored energy sufficient to operate the variator at the variator output speed, and providing torque to the transmission with the power source and the variator. In such an exemplary method, the variator is operated at the variator output speed using stored energy from the storage device to provide torque to the transmission. In addition, the torque provided to the transmission with the power source and the variator is sufficient to satisfy the travel speed request at the current power source speed.

In another exemplary embodiment of the present disclosure, a method of controlling a drive system operably connected to a power source and a transmission of a machine includes receiving a machine travel speed request, and determining an output speed of a variator, associated with the drive system, required to satisfy the travel speed request at a current power source speed. The method also includes providing torque to the transmission with the power source and the variator, via a planetary gear set of the drive system. In such an exemplary method, the variator is connected to a sun gear of the planetary gear set and is driven with stored electrical energy to operate at the variator output speed. In addition, the power source is connected to a ring gear of the planetary gear set, and the torque provided to the transmission with the power source and the variator is sufficient to satisfy the travel speed request at the current power source speed.

In a further exemplary embodiment of the present disclosure, a method of controlling a drive system operably connected to a power source and a transmission of a machine includes receiving a machine travel speed request, and determining an output speed of a variator, associated with the drive system, required to satisfy the travel speed request at a current power source speed. The method also includes providing torque to the transmission with the power source and the variator, via a planetary gear set of the drive system. In such an exemplary method, the variator is connected to a ring gear of the planetary gear set and is driven with stored hydraulic energy to operate at the variator output speed. In addition, the power source is connected to a sun gear of the planetary gear set, and the torque provided to the transmission with the power source and the variator is sufficient to satisfy the travel speed request at the current power source speed.

DETAILED DESCRIPTION

Figure 1:
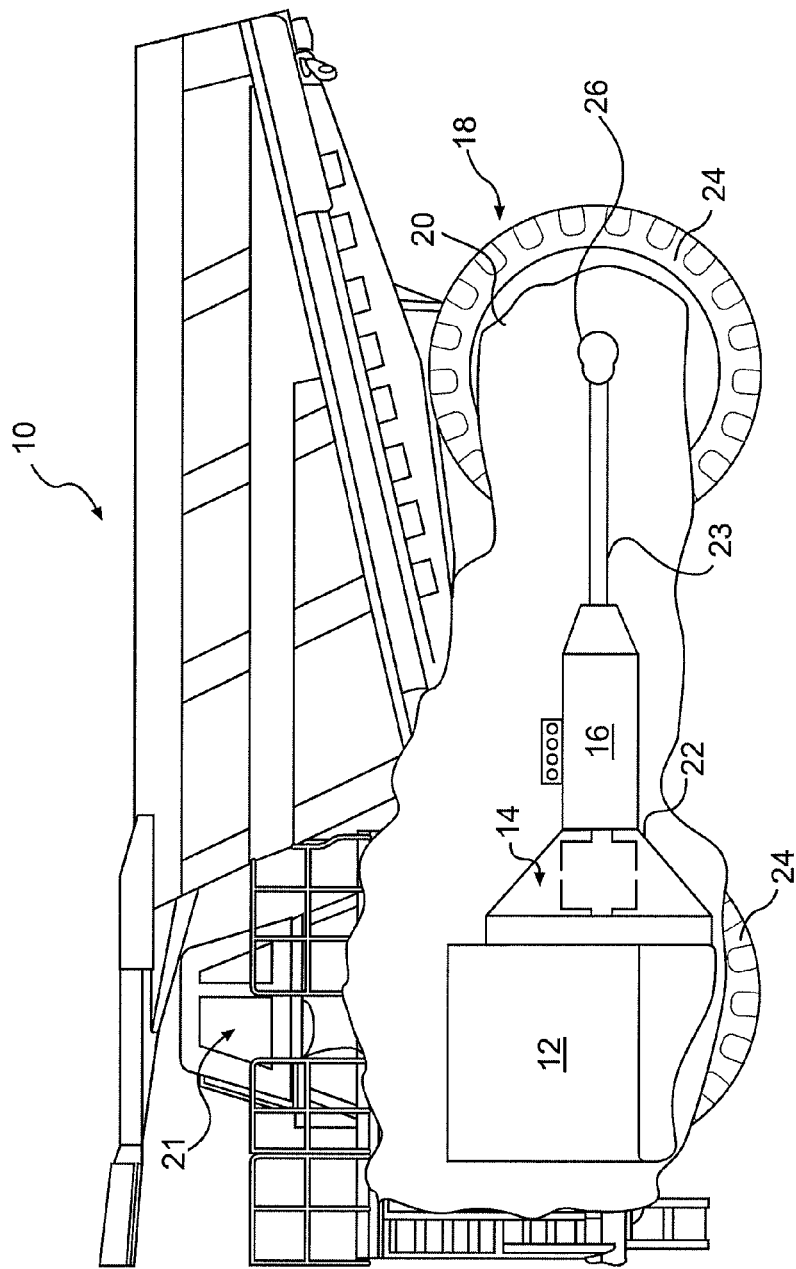
FIG. 1 is a diagrammatic illustration of an exemplary machine.

FIG. 1 illustrates an exemplary machine 10. The machine 10 may embody a mobile machine that performs some type of operation associated with an industry such as mining, construction, farming, transportation, or any other industry known in the art. For example, the machine 10 may be an earth moving machine such as an off-highway haul truck, a wheel loader, a motor grader, or any other suitable earth moving machine. The machine 10 may alternatively embody an on-highway truck, a passenger vehicle, or any other operation-performing machine. The machine 10 may include, among other things, a power source 12, a drive system 14, and a transmission 16. The machine 10 may also include one or more traction devices 18 operably connected to the transmission 16, a brake mechanism 20 associated with the traction device 18, and an operator station 21.

The power source 12 may be configured to produce a power output and may include an internal combustion engine. For example, the power source 12 may include a diesel engine, a gasoline engine, a gaseous fuel-powered engine, or any other engine apparent to one skilled in the art. It is contemplated that the power source 12 may alternatively include a non-combustion source such as, for example, a battery, a fuel cell, a motor, or any other known non-combustion source of power. In exemplary embodiments, the power source 12 may comprise a combination of one or more such sources of power and may be, for example, any type of hybrid power source known in the art.

The drive system 14 may comprise a torque converter, a clutch, a gear system, and/or any other like mechanical, hydraulic, hydro-mechanical, electrical, electromechanical, and/or pneumatic device configured to couple the power source 12 to the transmission 16. In each of the exemplary embodiments described herein, the drive system 14 may be configured to transmit torque from the power source 12 to the transmission 16. In exemplary embodiments in which the drive system 14 includes a torque converter, the torque converter may conduct pressurized fluid between the output of the power source 12 and the input of transmission 16 to thereby drive the transmission 16, while still allowing the power source 12 to rotate somewhat independently of transmission 16. In such exemplary embodiments, a drive system clutch may include a lockup clutch and/or other like mechanisms for directly mechanically coupling the output of power source 12 to the input of the transmission 16.

An exemplary torque converter and lockup clutch may be disposed within a single housing 22 of the drive system 14. In this arrangement, the torque converter of the drive system 14 may selectively absorb and/or multiply the torque transferred between the power source 12 and the transmission 16 by either allowing or preventing slippage between the output rotation of the power source 12 and the input rotation of the transmission 16. It is further contemplated that such a torque converter may alternatively embody a non-hydraulic device such as, for example, a mechanical diaphragm clutch.

As will be described in greater detail below with respect to FIGS. 3 and 4, in further exemplary embodiments, the drive system 14 may comprise a variator 28, a planetary gear set 30, and a clutch 67. In such exemplary embodiments, the torque converter and/or the clutch described above may be omitted from the drive system 14, and one or more of the variator 28, planetary gear set 30, and clutch 67 may be disposed within the housing 22 in place of such components. Thus, in exemplary embodiments, a drive system 14 including a torque converter may be retrofit with the variator 28-planetary gear set 30-clutch 67 configuration shown in either FIG. 3 or FIG. 4. In the exemplary embodiment of FIG. 3, the variator 28, planetary gear set 30, and clutch 67 may each be disposed within the housing 22. In such an exemplary embodiment, the variator 28 may be powered by electrical energy from a storage device 68, by mechanical energy received from the power source 12 via one or more belts, gears, or other like linkages 39, and/or by one or more electric motors or generators associated with the machine 10. Thus, in the embodiment of FIG. 3, the variator 28 may comprise any type of electric and/or electromechanical variator known in the art.

Figure 3:
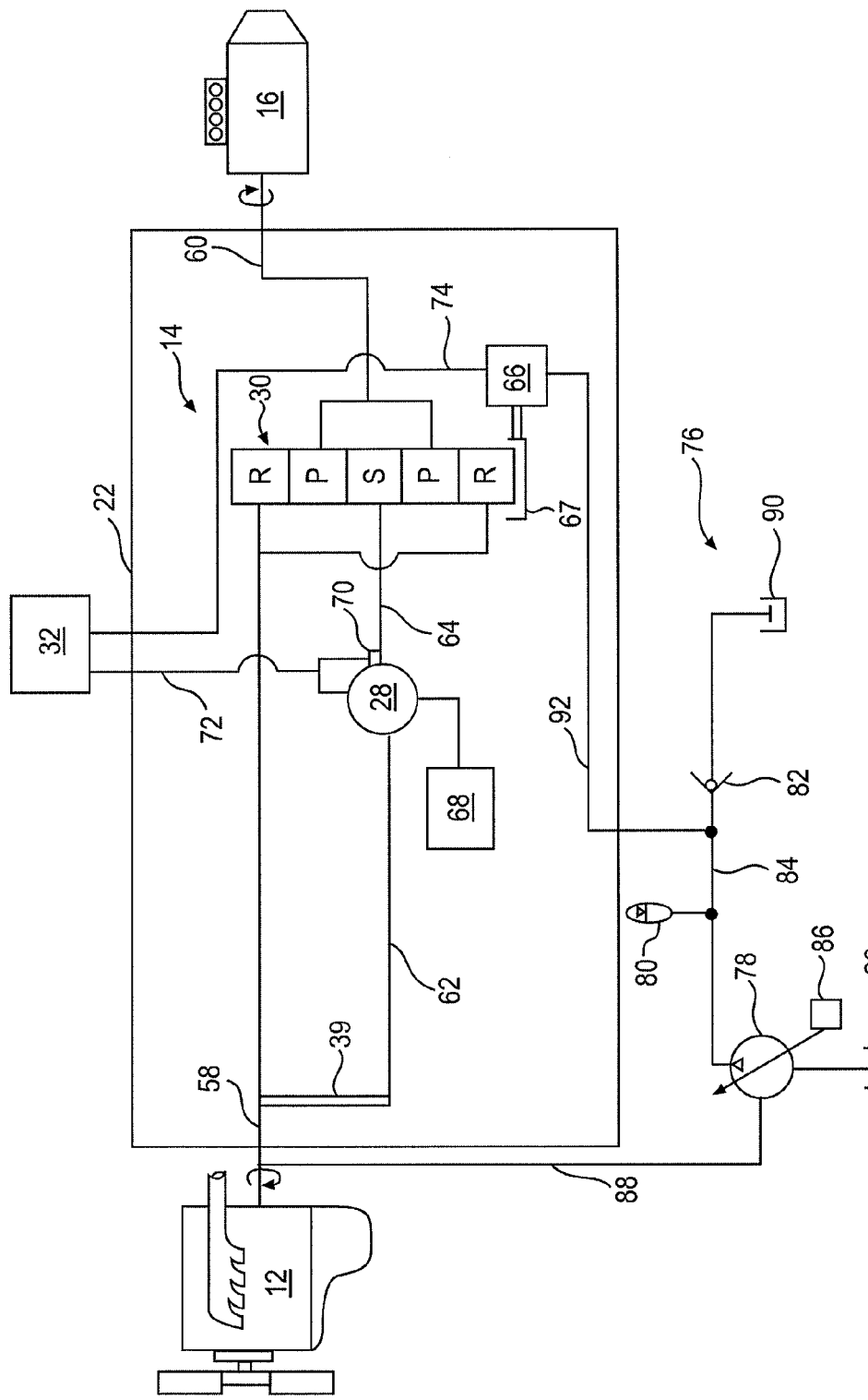
FIG. 3 is a diagrammatic illustration of an exemplary drive system associated with the machine of FIG. 1.
Figure 4:
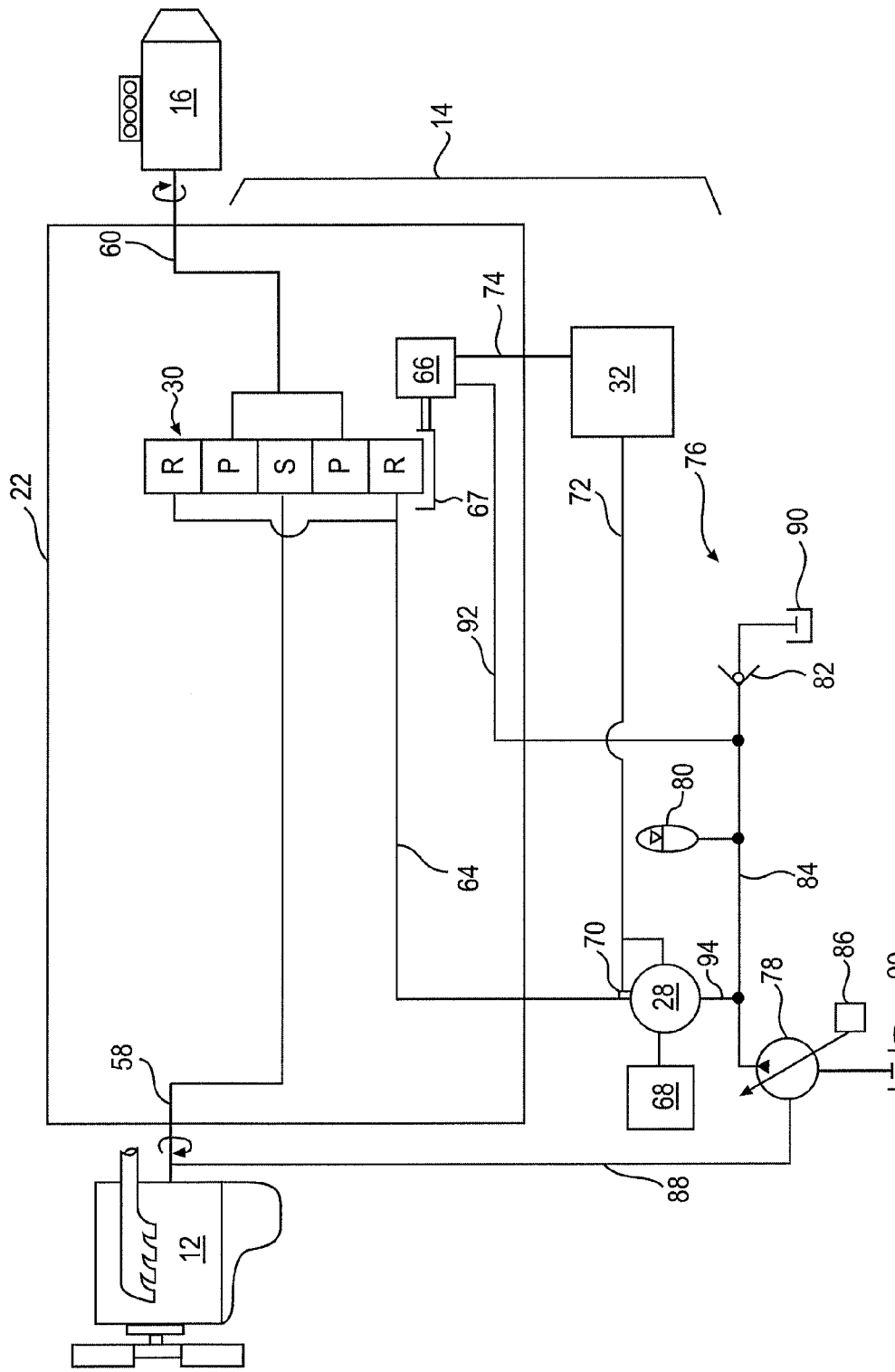
FIG. 4 is a diagrammatic illustration of another exemplary drive system associated with the machine of FIG. 1.

Alternatively, in the embodiment of FIG. 4, the planetary gear set 30 and the clutch 67 may be disposed within the housing 22 while the variator 28 may be disposed external to the housing 22. In such an exemplary embodiment, the variator 28 may be powered by energy received from the storage device 68, by mechanical energy received from the power source 12 via one or more belts, gears, countershafts 88, or other like linkages, and/or by a hydraulic circuit 76 associated with the machine 10. Thus, in the embodiment of FIG. 4, the variator 28 may comprise any type of hydraulic or pneumatic variator known in the art. As shown in FIGS. 3 and 4, in exemplary embodiments one or more additional components of the drive system 14 may also be powered by and/or receive pressurized fluid from the hydraulic circuit 76. For example, a valve arrangement 66 operably connected to the clutch 67 may receive pressurized fluid from the hydraulic circuit 76 to assist in selectively engaging and/or disengaging the clutch 67.

Figure 2:
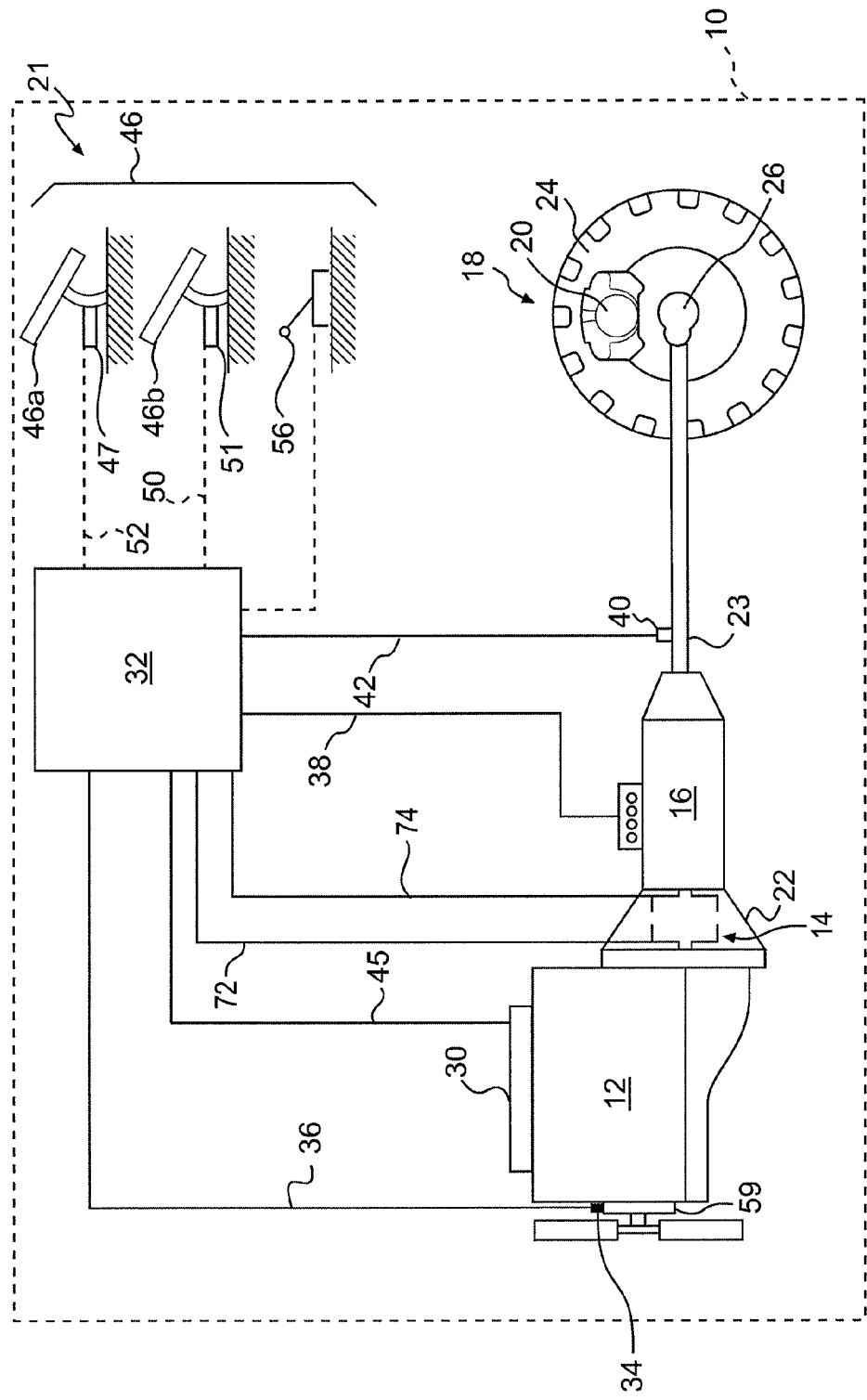
FIG. 2 is a further diagrammatic illustration of the machine shown in FIG. 1.

With continued reference to FIGS. 1 and 2, the transmission 16 may include numerous components that interact to transmit power from the power source 12, via the drive system 14, to the traction device 18. In particular, the transmission 16 may embody a multi-speed, bidirectional, mechanical transmission having a neutral gear ratio, a plurality of forward gear ratios, a reverse gear ratio, and one or more clutches (not shown). The clutches may be selectively actuated to engage predetermined combinations of gears (not shown) that produce a desired output gear ratio. The transmission 16 may be an automatic-type transmission, wherein shifting is based on a power source speed, a maximum selected gear ratio, and a shift map stored within a transmission controller and/or a controller 32 associated with the machine 10. The output of the transmission 16 may be connected to rotatably drive the traction device 18 via a shaft 23, thereby propelling the machine 10.

The traction device 18 may include wheels 24 located on each side of machine 10 (only one side shown). Alternately, the traction device 18 may include tracks, belts, or other driven traction devices. The traction device 18 may be driven by the transmission 16 to rotate in accordance with an output rotation of the transmission 16.

The brake mechanism 20 may be configured to retard the motion of machine 10 and may be operably associated with a wheel 24 of the machine 10. In exemplary embodiments, the brake mechanism 20 may be a hydraulic pressure-actuated wheel brake such as, for example a disk brake or a drum brake disposed intermediate a wheel 24 and a drive assembly 26. In such exemplary embodiments, the brake mechanism 20 may comprise a service brake of the machine 10. It is contemplated that the brake mechanism 20 may alternatively embody another non-hydraulic type of wheel brake such as an electric motor or any other similar mechanism known in the art.

The operator station 21 may be configured to receive input from a machine operator indicative of a desired acceleration and/or active retarding of the machine 10. Specifically, as illustrated in FIG. 2, the operator station 21 may include one or more operator interface devices 46 such as a throttle pedal 46a, a brake pedal 46b, and/or a single or multi-axis joystick 46c located forward of an operator seat. The operator interface devices 46 may embody proportional-type controllers configured to increase or decrease the acceleration of machine 10 by producing an acceleration signal that is indicative of a desired machine acceleration. It is contemplated that different operator interface devices may alternatively or additionally be included within operator station 21 such as, for example, wheels, knobs, push-pull devices, switches, levers, and other similar devices known in the art. Such additional operator interface devices may include, for example, a forward-neutral-reverse lever and/or other directional control devices.

The throttle pedal 46a may be manually actuated to increase the rotational speed of the power source 12 and the resulting travel speed of the machine 10. In particular, a degree of throttle pedal actuation may represent a desired acceleration and/or other like machine travel speed request, and may proportionally control an amount of fuel supplied to the power source 12. It is contemplated that the throttle pedal 46a may embody a mechanical device, an electrical device, a hydraulic device, or any other type of device known in the art.

A throttle sensor 47 may be provided for indicating whenever the throttle pedal 46a and/or the operator is actively indicating a desired acceleration of the machine 10, and the magnitude of the desired acceleration. The throttle sensor 47 may embody, for example, a switch or a pressure sensor capable of producing an electric signal indicating that positive acceleration is being requested. For example, such a signal may comprise a machine travel speed request, and may be sent to the controller 32 to assist in controlling the power source 12, the drive system 14, and/or the transmission 16. A switch may indicate a position or angle of throttle pedal 46a, while a pressure sensor may indicate a pressure of a pilot fluid pressurized by the motion of the throttle pedal 46a. For example, in embodiments in which the throttle sensor 47 comprises a pressure sensor, the throttle sensor 47 may produce electric signals indicative of fluid pressures associated with a throttle valve (not shown) and/or one or more fluid lines, pumps, and/or other hydraulic fluid components associated with the throttle pedal 46a. Such signals may be indicative of and/or responsive to manipulation of the throttle pedal 46a by the operator of the machine 10.

The brake pedal 46b may be manually operated to direct pressurized fluid to the brake mechanism 20. A degree of brake pedal actuation may proportionally control a pressure and/or a flow rate of the fluid supplied to brake mechanism 20. It is contemplated that the brake mechanism 20 may alternatively be pneumatically actuated, mechanically actuated, electrically actuated, or actuated in any other manner known in the art.

A brake sensor 51 may be provided for indicating whenever active retarding of machine travel is desired and what magnitude of retarding is desired. The brake sensor 51 may embody, for example, a switch or a pressure sensor capable of producing an electric signal indicating that negative acceleration is requested. A switch may indicate a position or angle of brake pedal 46b, while a pressure sensor may indicate a pressure of a pilot fluid pressurized by brake pedal 46b. For example, in embodiments in which the brake sensor 51 comprises a pressure sensor, the brake sensor 51 may produce electric signals indicative of a fluid pressure associated with a brake valve (not shown), brake line, brake fluid pump, and/or other pneumatic or hydraulic fluid components associated with the brake pedal 46b and/or the brake mechanism 20. It is understood that the signals generated by the brake sensor 51 may be indicative of and/or responsive to manipulation of the brake pedal 46b by the operator of the machine 10. It is understood that one or more sensors similar to the brake sensor 51 and throttle sensor 47 may also be associated with the joystick 46c.

The controller 32 may embody a single microprocessor or multiple microprocessors that include a means for controlling various components of the machine 10. Numerous commercially available microprocessors can be configured to perform the functions of the controller 32. It should be appreciated that the controller 32 could readily embody a general machine microprocessor capable of controlling numerous machine functions. Various other known circuits may be associated with the controller 32, including power supply circuitry, signal-conditioning circuitry, solenoid driver circuitry, communication circuitry, and other appropriate circuitry.

The controller 32 may be in communication with various components of the machine 10. In particular, the controller 32 may be in communication with a power source speed sensor 34 via a communication line 36 to receive an indication of a rotational speed of the power source 12. In exemplary embodiments, the controller 32 may be configured to determine, for example, an output torque generated by the power source 12 based on the power source speed and/or other operating characteristic of the machine 10 such as, for example, machine and/or implement load. The controller 32 may also be in communication with the power source 12 directly via a communication line 45 to control an increase and/or decrease in power source speed and/or power source output torque.

In addition, the controller 32 may be in communication with the transmission 16 via a communication line 38 to receive an indication of the transmission gear and/or the transmission gear ratio. Via the communication line 38, the controller 32 may also be configured to control shifting to a higher or lower transmission gear during operation of the machine 10. The controller 32 may also be in communication with a machine travel speed sensor 40 via a communication line 42 to receive an indication of a travel speed of the machine 10. Additionally, the controller 32 may be in communication with one or more components of the drive system 14. For example, the controller 32 may be in communication with the variator 28 via a communication line 72 and with the valve arrangement 66 and/or clutch 67 via a communication line 74. In exemplary embodiments, the controller 32 may be in communication with a variator speed sensor 70 via the communication line 72 to receive an indication of a rotational output speed of the variator 28. In exemplary embodiments, the controller 32 may be configured to determine, for example, an output torque generated by the variator 28 based on the variator output speed and/or other operating characteristic of the machine 10 such as, for example, machine and/or implement load.

The controller 32 may also be in communication with each of the operator interface devices 46 described herein. For example, the controller 32 may be in communication with the throttle pedal 46a, the brake pedal 46b, and the joystick 46c via communication lines 52, 50, and 56, respectively. In exemplary embodiments, the controller 32 may be in communication with the throttle sensor 47 via the communication line 52 and with the brake sensor 51 via the communication line 50.

The power source, machine travel, and variator speed sensors 34, 40, 70 may each embody magnetic pickup-type sensors. In particular, the power source speed sensor 34 may be associated with a flywheel 59 of the power source 12, and may be configured to sense a rotational speed and produce a corresponding speed signal. Similarly, the machine travel speed sensor 40 may be associated with the shaft 23, and configured to sense a travel speed and produce a corresponding speed signal. A variator speed sensor 70 may be associated with a shaft and/or other like output 64 of the variator 28, and may be configured to sense a rotational output speed and produce a corresponding speed signal.

With reference to the embodiments shown in FIGS. 3 and 4, the housing 22 may include any number of passages to permit input and/or output shafts to pass through the housing 22. Such input and/or output shafts may include, for example, an input 58 and an output 60 of the drive system 14. In exemplary embodiments, the input 58 may comprise and/or may be coupled to an output of the power source 12. Likewise, in exemplary embodiments, the output 60 may comprise and/or may be coupled to an input of the transmission 16. As shown in FIG. 4, in exemplary embodiments in which the variator 28 is disposed external to the housing 22, such input and/or output shafts may also include the output 64 of the variator 28. Alternatively, as shown in FIG. 3, in exemplary embodiments in which the variator 28 is disposed within the housing 22, the output 64 of the variator 28 may be coupled to the planetary gear set 30 without passing through the housing 22. In such embodiments, a shaft and/or other like input 62 of the variator 28 may be coupled to, for example, the input 58 via linkage 39.

The housing 22 may also include any number of additional passages to permit pneumatic and/or fluid lines to pass through the housing 22. Such fluid lines may fluidly connect the hydraulic circuit 76 with one or more components of the drive system 14. For example, in exemplary embodiments in which the valve assembly 66 and/or the clutch 67 comprise hydraulic components of the drive system 14, the valve assembly 66 and/or the clutch 67 may receive pressurized fluid from a supply line 84 of the hydraulic circuit 76 via one or more fluid lines 92. In further exemplary embodiments in which the valve assembly 66 and/or the clutch 67 comprise electric or electromechanical components of the drive system 14, the one or more fluid lines 92 and corresponding housing passages may be omitted.

The variator 28 may comprise any device configured to controllably provide a variable amount of supplemental torque to the transmission 16. Torque provided by the variator 28 may assist the transmission 16 in satisfying machine travel speed request. In addition, the variator 28 may allow for independent control of the torque transmitted to the transmission 16 thereby. Thus, the variator 28 may enable the drive system 14 to vary the torque provided to the transmission 16, in response to dynamic speed and/or torque requests received from the operator, without relying solely on the power source 12 for such torque variations. It is understood that the power source 12 may operate with peak efficiency during situations in which variations in power source output speed and/or torque are minimized. Thus, the variator 28 may enable the drive system 14 to satisfy such dynamic speed and/or torque requests while substantially constant operation of the power source 12 is maintained. By reducing, for example, the magnitude and/or number of power source speed changes during a given operation, the power source 12 may be calibrated for optimum efficiency within a relatively small operating window and the variator 28 may be employed to satisfy torque and/or speed requests falling outside of this window. Such control may maximize the operational efficiency of the machine 10.

In addition, the speed and/or torque output of the variator 28 may be independently controlled, throughout the entire operating range of the power source 12, in response to such dynamic speed and/or torque requests. The use of such an independently controlled variator 28 may be advantageous in a variety of machine operating conditions such as, for example, in situations where the power source speed is relatively low and a relatively large torque and/or speed request is received from the operator. Such operating conditions may include, for example, situations where a wheel loader bucket and/or other machine implement has been loaded with material from a pile and the operator commands the wheel loader to reverse machine travel direction (i.e., back away from the pile) at relatively high load.

Moreover, exemplary variators 28 of the present disclosure may provide and/or utilize advantageous energy storage capabilities. For example, in machine operating conditions in which an output of the power source 12 exceeds dynamic machine travel speed and/or torque requests received from the operator, the variator 28 may facilitate storage of excess energy provided to the drive system 14 by the power source 12. For example, the variator 28 may be configured to direct such excess energy to the storage device 68 for storage and/or later use by the variator 28. Such stored energy may be used to power the variator 28 during the operations described above in which supplemental torque is required to satisfy dynamic machine travel speed and/or torque requests received from the operator. Known torque converters, on the other hand, do not provide such energy storage capabilities. Instead, any excess torque and/or kinetic energy provided to known torque converter-based drive systems is typically transformed to thermal energy. Such thermal energy can be harmful to drive system components. In addition, such torque converter-based drive systems and may require cooling, thereby resulting in an additional drain on machine resources.

In exemplary embodiments, an electric and/or electromechanical variator 28 may comprise an internal starter generator or a passive flywheel. Alternatively, a hydraulic variator 28 may comprise, for example, a motor/generator combination, a pump/motor combination, or a hydraulic (i.e., hybrid) flywheel. In embodiments in which the variator 28 comprises an internal starter generator, the internal starter generator may comprise, for example, a three-phase permanent magnet alternating field-type generator configured to produce a power output in response to a rotational input from the power source 12. It is also contemplated that such an internal starter generator may be a switched reluctance generator, a direct phase generator, or any other appropriate type of generator known in the art. Internal starter generators of the types described herein may include a rotor (not shown) rotatably connected to the power source 12 by any means known in the art such as, for example, by the linkage 39, via a gear train, or in any other appropriate manner. Such a rotor may be configured to produce electrical power output as the rotor is rotated within a stator (not shown) of the variator 28. In such exemplary embodiments, the variator 28 may be electrically connected to an inverter (not shown) configured to invert, for example, three-phase alternating power to direct phase power.

The storage device 68 may comprise one or more batteries, capacitors, and/or other rechargeable power storage devices known in the art. Additionally, in exemplary embodiments in which the variator 28 comprises a hydraulic variator, the storage device 68 may comprise a fluid accumulator and/or other like fluid storage device. Thus, the variator 28 may be electrically or fluidly connected to the storage device 68 depending on the type of variator 28 being employed. Such connections may enable to variator 28 to repeatedly and selectively provide energy to and/or to remove energy from the power storage device 68. Likewise, the storage device 68 may be configured to repeatedly and selectively receive energy from and/or provide energy to the variator 28. It is understood that in exemplary embodiments in which the variator 28 comprises an electric or an electromechanical variator, such energy may be in the form of electric power. In exemplary embodiments in which the variator 28 comprises a hydraulic variator, such energy may be in the form of pressurized hydraulic fluid.

The planetary gear set 30 may have at least three elements, including a sun gear ("S"), a planet carrier ("P") having at least one set of planet gears, and a ring gear ("R"). The planet gears of the planet carrier P may mesh with the sun gear S and the ring gear R. Additionally, the planet gears of the planet carrier P may mesh with intermediate planet gears of the same planet carrier P if intermediate planet gears are included in the planetary gear set. The sun gear S, planet carrier P, planet gears, and ring gear R may all rotate together simultaneously. Alternatively, each of the sun gear S, planet carrier P, and ring gear R may be held stationary. During use, the planetary gear set 30 may receive one or more input rotations and generate one or more corresponding output rotations. The change in rotational speed between the inputs and the outputs may depend upon the number of teeth in the sun gear S and the ring gear R. The change in rotational speed may also depend upon the gear(s) that is used to receive the input rotation, the gear(s) that is selected to provide the output rotation, and which gear, if any, is held stationary.

The variator 28 may be coupled to the planetary gear set 30 via the output 64, and an output of the power source 12 may be coupled to the planetary gear set 30 via the input 58. The connection between the variator 28 and the planetary gear set 30 may depend upon, among other things, whether the variator 28 is disposed internal to the housing 22 as shown in FIG. 3, or external to the housing 22 as shown in FIG. 4. For example, in exemplary embodiments in which the variator 28 is disposed internal to the housing 22, the output 64 may be coupled to the sun gear S of the planetary gear set 30 while the power source 12 may be coupled to the ring gear R of the planetary gear set 30 via input 58. Alternatively, in exemplary embodiments in which the variator 28 is disposed external to the housing 22, the output 64 may be coupled to the ring gear R of the planetary gear set 30 while the power source 12 may be coupled to the sun gear S of the planetary gear set 30 via input 58. In the exemplary embodiments of FIGS. 3 and 4, the transmission 16 may be coupled to the planet carrier P of the planetary gear set 30 via the output 60. The structure of the gears, input members, output members, coupling members, and the connections therebetween can be achieved using components known in the art.

The valve arrangement 66 may be configured to receive pressurized fluid from and drain fluid to the hydraulic circuit 76. Specifically, the valve arrangement 66 may have a valve element (not shown) in communication with hydraulic circuit 76 via the fluid line 92. The valve element may be movable to selectively fill one or more pressure chambers of the valve arrangement 66 while simultaneously connecting another of the pressure chambers with a low pressure tank 90 via a drain passage (not shown). It is contemplated that in addition to or in place of the valve arrangement 66, a hydraulic or electric motor (not shown) may be implemented to drive the clutch 67.

The clutch 67 may be a hydro-mechanical device, mechanical device, or electro-mechanical device configured to selective couple and decouple the input 58 and the output 60. For example, the clutch 67 may embody a hydraulic impeller or mechanical spring type torque converter, an electro-mechanical lockup clutch, a mechanical diaphragm clutch, or any other type of clutch mechanism known in the art. The clutch 67 may selectively absorb and multiply the torque transferred between power source 12 and transmission 16 by either allowing or preventing slippage between the rotation of the input 58 and the rotation of the output 60.

In exemplary embodiments, the clutch 67 may be configured to couple any two gears and/or other components of the planetary gear set 30 together. For example, the clutch 67 may be configured to selectively couple the planet carrier P with the ring gear R, or to couple the planet carrier P with the sun gear S. By coupling any two components of the planetary gear set 30 in this way, the clutch 67 may be operable to form a direct linkage (i.e., a one-to-one rotational relationship) between, the input 58 and the output 60. In such a coupled and/or locked configuration, all gears and/or components of the planetary gear set 30 may rotate together in unison, and the variator 28 may not be operable to affect the torque and/or speed output of the drive system 14. In further exemplary embodiments, however, it is understood that the variator 28 may be operable to affect the torque and/or speed output of the drive system 14 regardless of whether or not two or more components of the planetary gear set 30 are locked. In such embodiments, for example, the variator 28 may be configured to provide torque to the transmission 16 and/or receive torque from at least one of the transmission 16 and the power source 12 while the planetary gear set 30 is in a locked configuration. Activation and/or deactivation of the clutch 67 may be selectively controlled by operation of the valve arrangement 66.

The hydraulic circuit 76 may be configured to provide pressurized fluid to one or more components of the machine 10. As illustrated in FIGS. 3 and 4, in exemplary embodiments, the hydraulic circuit 76 may be fluidly connected to and/or otherwise configured to provide pressurized fluid to one or more components of the drive system 14 including a hydraulic variator 28, the valve arrangement 66, and/or the clutch 67. One or more components of the hydraulic circuit 76 may be driven by the power source 12 to pressurize fluid and deliver the pressurized fluid to various machine components. In particular, the hydraulic circuit 76 may include a high pressure source 78, an accumulator 80, and a pressure relief valve 82. The source 78, accumulator 80, and pressure relief valve 82 may be fluidly connected to one another by a common supply line 84. Additionally, in exemplary embodiments in which the variator 28 comprises a hydraulic variator, the variator 28 may be fluidly connected to the supply line 84 via a fluid line 94.

The high pressure source 78 may supply a high pressure flow of fluid to the supply line 84. The source 78 may include any type of variable displacement pump such as, for example a swash or wobble plate-type pump, wherein an angle of the plate is changed by a separate or integral pump controller 86 to thereby modify a pumping displacement of associated pistons. In additional exemplary embodiments, the source 78 may comprise a metering sleeve-type pump, wherein an amount of displaced fluid is spilled past a sleeve member to modify an effective displacement of the associated pistons. The source 78 may be drivably connected to an output of the power source 12 and/or to the input 58 by, for example, a countershaft 88, a belt (not shown), an electrical circuit (not shown), or in any other suitable manner.

The accumulator 80 may embody a pressure vessel connected to the supply line 84. In exemplary embodiments, the accumulator 80 may be fluidly connected to the supply line 84 sequentially between the connections of fluid lines 92 and 94. Alternatively, as shown in FIG. 3, the accumulator 80 may be fluidly connected to the supply line 84 sequentially between the connections of fluid line 92 and the high pressure source 78. The accumulator 80 may filled with a compressible gas and configured to store pressurized fluid for future use. The compressible gas may include, for example, nitrogen or another appropriate compressible gas. As fluid in communication with the accumulator 80 exceeds a predetermined pressure, it may flow into accumulator 80. Because the nitrogen gas is compressible, it may act like a spring and compress as the fluid flows into accumulator 80. When the pressure of the fluid within passageways communicated with accumulator 80 drops below a predetermined pressure, the compressed nitrogen within accumulator 80 may expand and urge the fluid from within accumulator 80 to exit into the supply line 84. It is contemplated that the accumulator 80 may alternatively embody a spring biased-type of accumulator, if desired.

The pressure relief valve 82 may be disposed downstream of the accumulator 80 to selectively pass fluid to the low pressure tank 90 in response to a pressure of the fluid within common supply line 84. By way of example, the pressure relief valve 82 may include a valve element (not shown) that is spring biased toward a flow blocking position and movable toward a flow passing position in response to a pressure of the fluid within the supply line 84. When the pressure within the supply line 84 exceeds a predetermined threshold, the force generated by the fluid pressure acting on the valve element may overcome the spring force allowing the valve element to move to the second position. In this manner, the pressure relief valve 82 may function to maintain a predetermined pressure within the supply line 84. It is contemplated that the pressure relief valve 82 may have a variable pressure setting and/or be electronically actuated in response to a monitored pressure, if desired.

The low pressure tank 90 may embody a reservoir configured to hold a supply of fluid. The fluid may include, for example, an engine lubrication oil, a transmission lubrication oil, a separate hydraulic oil, or any other fluid known in the art. The high pressure source 78, and/or any of the other hydraulic components of the machine 10 or the drive system 14 may draw fluid from and return fluid to tank 90.

Figure 5:
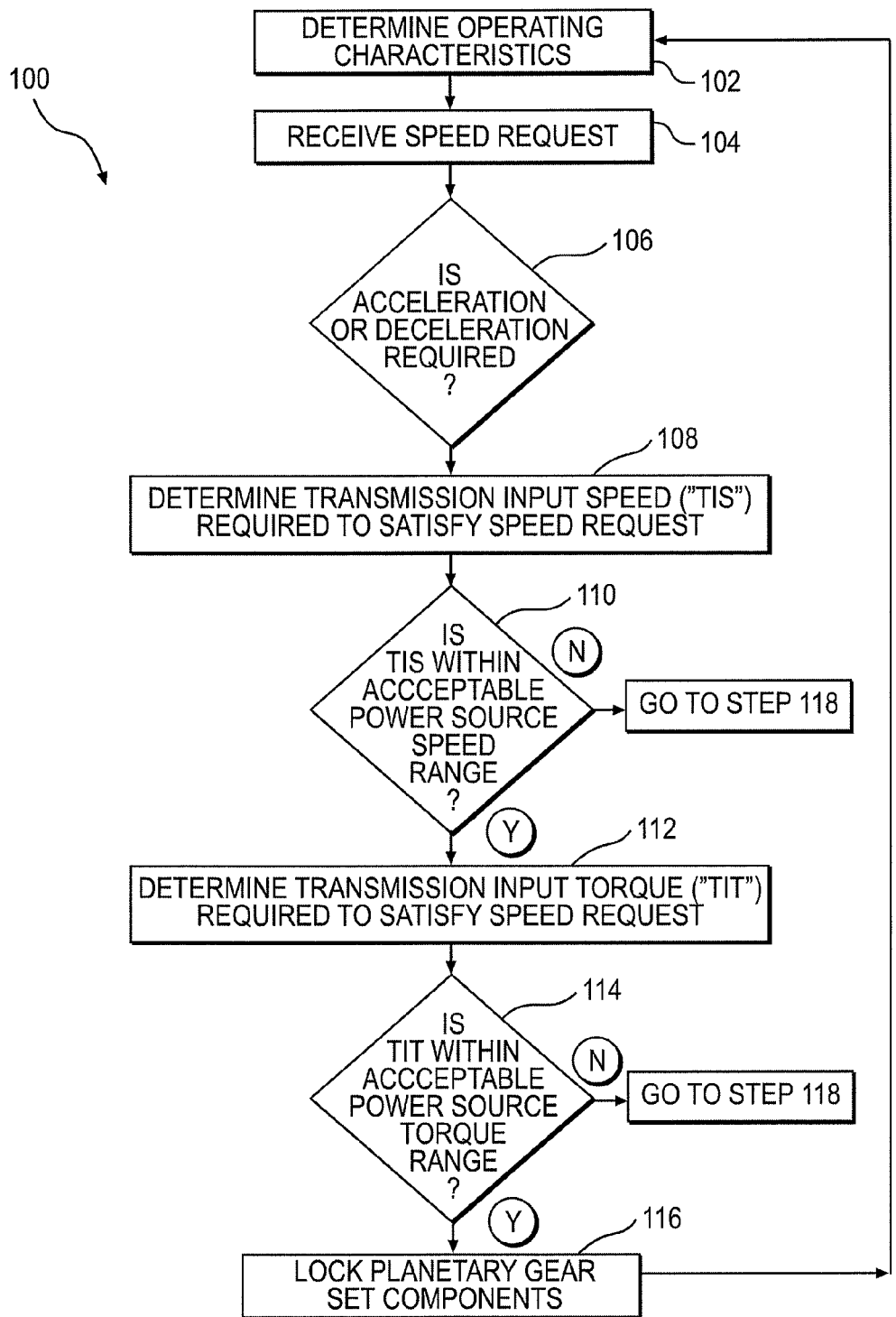
FIG. 5 is a flow chart depicting an exemplary method of operating a drive system.

The flow chart 100 shown in FIG. 5 illustrates an exemplary method of operating the drive system 14, and FIG. 5 will be described in detail below.

INDUSTRIAL APPLICABILITY

The disclosed drive systems 14 may be used with any machine where acceleration or deceleration is desired, and may be useful during operations in which torque from the power source 12 is not sufficient to satisfy a travel speed request of the machine operator. Such operations may include situations in which the machine 10 is operating at relatively high load, such as when a bucket or other implement of the machine 10 has been filled with material from a pile and the operator controls the machine 10 to back away from the pile in a reverse direction. While operating at high load, the majority of the torque output by the power source 12 may be used to satisfy torque requests associated with operation of the bucket. In such situations, the variator 28 may be used to provide required additional (i.e., supplemental) torque to the transmission 16, thereby enabling the machine 10 to satisfy the travel speed request while simultaneously satisfying the torque demand associated with the high implement load.

Although known machines may employ torque converters and other like components to assist in satisfying machine travel speed requests during high load operations, such components are highly inefficient and are typically disfavored by machine manufacturers. For example, such components provide no independent control over the amount of torque provided to or drawn from the transmission. Since these components do not allow for such independent control, systems employing such components must rely solely on regulation of power source output to control, for example, the amount of torque provided to the transmission 16. This can be problematic in situations where a variable transmission input speed is required to satisfy machine speed requests. For example, typical power sources only have three or four gears governing power source output speed, and such power sources typically have a sizeable speed gap between such gears. Thus, changing power source gears to satisfy machine speed requests can be highly inefficient. The variator-based drive systems 14 of the present disclosure, on the other hand, can be independently controlled to assist the power source 12 in satisfying varying speed requests, thus minimizing the number of power source gear changes required during a given operation, and maximizing operational efficiency.

Additionally, known torque converters and other like components do not enable energy storage during operations in which more torque is being produced by the power source 12 than can be used by the machine 10 or its implements. For instance, in situations in which the machine 10 has been driven into a pile of material and power source torque is being used to assist the implement in removing material from the pile, torque converters and other like components may not be capable of harnessing excess torque generated by the power source 12. Instead, the energy associated with such excess torque is converted to heat by such components. Over time, such heat generation can be harmful to such components and/or to the machine 10. Additionally, such components may require periodic cooling which results in an unwanted drain on machine resources. The drive systems 14 of the present disclosure, on the other hand, are configured to store excess energy received via the power source 12 and/or the transmission 16 during operation. For example, such energy may be stored in the storage device 68 associated with the variator 28 for use by the variator 28 in later operations. Such energy storage maximizes the operational efficiency of the machine 10, and extends the useful life of the various machine components by reducing harmful heat generation.

As shown in FIG. 5, during an exemplary operation of the drive system 14, the various sensors described herein and/or the controller 32 may determine one or more operating characteristics of the machine 10 (Step: 102). It is understood that in each of the exemplary embodiments described herein, the drive system 14 may be controlled in an open-loop or a closed-loop manner. Additionally, the operating characteristics determined at Step: 102 may include, for example, the power source output torque, power source output speed, variator output torque, variator output speed, machine travel speed, transmission gear, transmission gear ratio, and/or any of the other operating characteristics described herein. Such operating characteristics may be determined by any of the sensors described herein and/or may be calculated or otherwise determined by the controller 32 upon receipt of one or more signals from the various machine sensors. For example, information included in such signals may be input into one or more algorithms, control maps, look-up tables and/or any other like controller software or hardware components, and such operating characteristics may comprise outputs of these components.

At Step: 104, the controller 32 may receive a machine travel speed request from an operator of the machine 10. For example, the throttle pedal 46a may be manually actuated to increase the rotational speed of the power source 12 and the resulting travel speed of the machine 10. Such actuation may direct a signal from the throttle pedal 46a and/or the throttle sensor 47 to the controller 32 indicative of the machine travel speed request. In additional exemplary embodiments, one or more of the other operator interface devices 46 may also be used to send a signal to the controller 32 indicative of such a travel speed request.

Upon receiving such a speed request, the controller 32 may determine whether the travel speed request is indicative of machine acceleration (i.e., increasing an output speed of the transmission 16) or machine braking (i.e., decreasing an output speed of the transmission 16) (Step: 106). At Step: 106, for example, the controller 32 may compare the current machine travel speed to the travel speed request received at Step: 104 in order to make such a determination. For example, if the current machine travel speed is below the machine travel speed request, the controller 32 may determine that acceleration is required. In response to such a determination at Step: 106, the controller 32 may utilize and/or process a first set of operating characteristics determined at Step: 102 to govern machine control. Such an exemplary first set of operating characteristics may correspond to the amount of acceleration required to satisfy the travel speed request and may include, for example, throttle pedal position, transmission output speed, implement load, and/or other like operating characteristics associated with the current operation of the machine 10. If, on the other hand, if the current machine travel speed is above the machine travel speed request, the controller 32 may determine that machine coasting and/or braking is required. In response to such a determination at Step: 106, the controller 32 may utilize and/or process a second set of operating characteristics determined at Step: 102 to govern machine control. Such an exemplary second set of operating characteristics may correspond to the amount of coasting and/or braking required to satisfy the travel speed request and may include, for example, brake pedal position, transmission output speed, implement load, and/or other like operating characteristics associated with the current operation of the machine 10.

Upon determining whether acceleration or braking is required at Step: 106, control may proceed to Step: 108 where the controller 32 may determine a transmission input speed ("TIS") required to satisfy the travel speed request. For example, the controller 32 may utilize information indicative of the current power source speed, current transmission gear ratio, and/or current variator output speed as inputs into one or more of the algorithms, control maps, look-up tables and/or other controller components described above in determining the TIS. At Step: 110, the controller 32 may determine whether the TIS determined at Step: 108 is within an acceptable power source speed range. For example, at Step: 110, the controller 32 may determine whether the TIS is achievable within a safe operating speed range of the power source 12. Operating the power source 12 outside of such an acceptable power source speed range may cause damage to, for example, one or more components of the power source 12 and/or machine components coupled thereto. The acceptable power source speed range may vary depending on the capacity, model, configuration, and/or other characteristics of the power source 12. In an exemplary embodiment, an acceptable power source speed range may be between approximately 1200 rpm and approximately 2200 rpm. In still further exemplary embodiments, such an acceptable power source speed range may be between approximately 600 rpm and approximately 2600 rpm. If, the TIS is outside of the acceptable power source speed range (Step: 110—No), control may proceed to Step: 118. Step 118 will be discussed in greater detail below.

If, on the other hand, the TIS is within the acceptable power source speed range (Step: 110—Yes), the controller 32 may determine a transmission input torque (TIT) required to satisfy the travel speed request received at Step: 104 (Step: 112). For example, the controller 32 may utilize information indicative of the current power source output torque, current transmission gear ratio, and/or current variator output torque as inputs into one or more of the algorithms, control maps, look-up tables and/or other controller components described herein in determining the TIT. In exemplary embodiments, the TIT determined at Step: 112 may be an estimation based on the current operating characteristics of the machine 10 determined at Step: 102.

In further exemplary embodiments, one or more additional inputs may be utilized to determine the TIT at Step: 112. Such inputs may include, for example, global positioning system ("GPS") inputs indicative of a location of the machine 10. For example, signals received from a GPS associated with the machine 10 and indicative of a position of the machine 10 at a worksite may be input into one or more of the algorithms control maps, look-up tables and/or other controller components described above. The controller 32 may be configured to recognize the location of the machine 10, and to associate the determined location with previous TIT corresponding to the location. Accordingly, in such exemplary embodiments, the controller 32 may have one or more locations and/or previously determined TIT stored in a memory thereof, and the controller 32 may be configured to control operation of the power source 12, drive system 14, and/or transmission 16 based on such stored (i.e., "learned") information. In such exemplary embodiments, the controller 32 may employ one or more neural networks or other like software and/or hardware components configured to assist in such learned control of the machine 10.

At Step: 114, the controller 32 may determine whether the TIT determined at Step: 112 is within an acceptable power source torque range. For example, at Step: 114, the controller 32 may determine whether the TIT is achievable within a safe operating torque range of the power source 12. Operating the power source 12 outside of such an acceptable power source torque range may cause damage to, for example, one or more components of the power source 12 and/or machine components coupled thereto. Such power source torque ranges may vary depending on the capacity, model, configuration, and/or other characteristics of the power source 12. In an exemplary embodiment, an acceptable power source torque range may be between approximately −250 Nm and approximately 1000 Nm, where negative torque is indicative of retarding capacity. In still further exemplary embodiments, such an acceptable power source torque range may be between approximately −1500 Nm and approximately 2500 Nm. It is understood that such exemplary power source torque ranges may be dependent upon, for example, power source capacity and current power source speed, among other things. If, the TIT is outside of the acceptable power source torque range (Step: 114—No), control may proceed to Step: 118 as described below.

If, on the other hand, the TIT is within the acceptable power source torque range (Step: 114—Yes), the controller 32 may lock two or more components of the planetary gear set 30 together (Step: 116). For example, in embodiments in which the variator 28 comprises an electric and/or an electromechanical variator, the controller 32 may control the valve arrangement 66 to engage the clutch 67 at Step: 116. In such exemplary embodiments, engagement of the clutch 67 may couple, for example, the ring gear R to the sun gear S, thereby forming a direct linkage between the power source 12 and the transmission 16. In alternative exemplary embodiments in which the variator 28 comprises a hydraulic variator, the controller 32 may control the valve arrangement 66 to engage the clutch 67 at Step: 116 to couple, for example, the ring gear R to the planet carrier P. Such coupling may form a direct linkage between, the power source 12 and the transmission 16. In the exemplary embodiments described herein, engaging the clutch 67 to lock two or more components of the planetary gear set 30 may effectively disable the variator 28 and/or place the variator 28 in a minimum displacement mode in which the variator 28 provides negligible torque to the transmission 16. In such exemplary embodiments, the power source 12 alone may be fully capable of satisfying the various speed and/or torque requests of the machine 10 without requiring and/or utilizing supplemental torque from the variator 28. Upon locking two or more components of the planetary gear set 30 at Step: 116, control may proceed to Step: 102 in a closed-loop manner.

As shown in FIG. 5, if the controller 32 determines that either the TIS is outside of the acceptable power source speed range (Step: 110—No) or the TIT is outside of the acceptable power source torque range (Step: 114—No), operation of the variator 28 may be required to provide supplemental torque to the transmission 16 or to remove excess torque from the transmission 16 and/or the power source 12. In such situations, control may proceed to Step: 118 where the controller 32 may determine a variator output speed ("VOS"), required to satisfy the machine travel speed request received at Step: 104, at the current power source speed. In such exemplary embodiments, the VOS determined at Step: 118 may be useful in minimizing the gear changes and/or other operational dynamics of the power source 12. For example, once control has reached Step: 118, the controller 32 may, when possible, employ a machine control strategy focused on maintaining the power source speed substantially constant. Such a strategy may minimize the gear changes and/or other operational dynamics of the power source 12, and may result in improved power source efficiency.

At Step: 120, the controller 32 may determine whether the VOS is within an acceptable variator speed range. For example, at Step: 120, the controller 32 may determine whether the VOS is achievable within a safe operating speed range of the variator 28. Operating the variator 28 outside of such an acceptable speed range may cause damage to, for example, one or more components of the variator 28 and/or machine components coupled thereto. Such variator speed ranges may vary depending on the size, capacity, model, configuration, and/or other characteristics of the variator 28. The variator 28 may have a much wider acceptable speed range than the power source 12, and may have greater responsiveness to varying speed and/or torque requests. As a result, in exemplary embodiments of the present disclosure, it may be preferable to satisfy varying speed and/or torque requests by changing the output speed of the variator 28 as compared to changing the output speed of the power source 12. In an exemplary embodiment, an acceptable variator speed range may be between approximately −4000 rpm and approximately +4000 rpm.

It is understood that in exemplary operations in which the variator 28 is providing torque and/or energy to the transmission 16, the variator speed may represented with a positive sign. Such operations may be referred to herein as "positive speed operations." In such positive speed operations, energy stored within the storage device 68 may be used to drive the variator 28 at such a positive speed. Alternatively, in exemplary operations in which the variator 28 is receiving and/or removing energy from the transmission 12 and/or the power source 12, the variator speed may be represented with a negative sign. Such operations may be referred to herein as "negative speed operations." In such negative speed operations, the variator 28 may direct such energy to the storage device 68 for storage therein. Such stored energy may be provided to the variator 28 and/or otherwise used in later positive speed operations in which supplemental torque and/or energy is required from the variator 28. As described above, the energy stored in the storage device 68 may be electric or hydraulic in nature.

With continued reference to FIG. 5, if the VOS is within the acceptable variator speed range (Step: 120—Yes), control may proceed to Step: 122 where the controller 32 may determine whether there is adequate stored energy within the storage device 68 to operate the variator 28 at the VOS (in positive speed operations) or sufficient storage capacity in the storage device 68 to store additional energy received by the variator 28 from the power source 12 and/or the transmission 16 (in negative speed operations).

In exemplary negative speed operations, the storage capacity determination made at Step 122 may be based on an estimated amount of energy that would be received by the variator 28 from the power source 12 and/or the transmission 16 if the variator 28 was operated at the VOS, and the power source 12 and the transmission 16 each maintained their respective output speeds, output torques, and/or other steady state operations. Alternatively, the storage capacity determination made at Step 122 may be based on an estimated amount of energy that would be received by the variator 28 from the power source 12 and/or the transmission 16 if the variator 28 was operated at the VOS, and an output of at least one of the power source 12 and the transmission 16 was modified to satisfy the travel speed request received at Step: 104. In exemplary embodiments, such estimate amounts of energy that would be received by the variator 28 may be determined by the controller 32 using any of the algorithms control maps, look-up tables and/or other controller components described above.

If the controller 32 determines that there is either adequate stored energy within the storage device 68 to operate the variator 28 at the VOS (in positive speed operations) or sufficient storage capacity in the storage device 68 to store additional energy received by the variator 28 from the power source 12 and/or the transmission 16 (in negative speed operations) (Step: 122—Yes), control may proceed to Step: 124. At Step: 124, the controller 32 may operate the variator 28 at the VOS (in positive speed operations), and the variator 28 may provide supplemental torque and/or energy to the transmission 16 via the planetary gear system 30. In such exemplary embodiments, the amount of torque provided to the transmission 16 by the variator 28 may be based on, may be a function of, and/or may otherwise correspond to the VOS. In exemplary embodiments, the amount of torque provided to the transmission 16 by the variator 28 may be substantially equal to the VOS. It is understood, however, that in exemplary embodiments of the present disclosure the TIT may be substantially equal to the sum of the variator output torque and the power source output torque. Thus, the TIT may or may not be directly related to the VOS. In the exemplary embodiments described herein, the torque provided to the transmission 16 by the power source 16 and the variator 28 by, for example, operating the variator 28 at the VOS at Step: 124, may be sufficient to satisfy the travel speed request at the current power source speed (i.e., without changing the output speed, output torque, or gear of the power source 12).

In further exemplary embodiments, at Step: 124 the controller 32 may control the variator 28 to direct excess energy to the storage device 64 for storage therein (in negative speed operations). From Step: 124, control may proceed, in a closed-loop manner, to Step: 102.

As shown in FIG. 5, if the controller 32 determines that the VOS is outside of the acceptable variator speed range (Step: 120—No), or that there is either 1) inadequate stored energy in the storage device 68 to operate the variator 28 at the VOS or 2) inadequate storage capacity in the storage device 68 to store additional energy (Step: 122—No), the controller 32 may attempt to determine whether the machine travel speed request may be satisfied by changing the power source speed, or alternatively, whether changing the current transmission gear may be required. It is understood, that in further exemplary negative speed operations, if the controller 32 determines that there is inadequate storage capacity in the storage device 68 to store additional energy (Step: 122—No), the controller 32 may be configured to automatically override such a determination if it is possible and/or acceptable to bleed such additional energy off to a heat sink, tank 90, and/or some other location on, or component of, the machine 10. In such exemplary override situations, control may proceed from Step: 122 to Step: 124 despite forming a negative conclusion at Step: 122.

Once control reaches Step: 128, the controller 32 may determine whether the current power source speed is substantially equal to an upper or lower limit of the acceptable power source speed range (described above with respect to, for example, Step: 110). For example, in embodiments in which the VOS is outside of the acceptable variator speed range, the controller 32 may compare the current power source speed to the limits of the acceptable power source speed range in order to determine whether it is possible to satisfy the travel speed request by increasing or decreasing the power source speed. If the power source 12 is already operating at one of the limits of the acceptable power source speed range (Step: 128—Yes), it may not be possible to satisfy the travel speed request by increasing or decreasing the power source speed, and control may proceed to Step: 134. At Step: 134, the controller 32 may operate the transmission 16 to upshift, downshift, and/or otherwise change gear. It is understood that lower transmission gears may have higher gear ratios than relatively higher transmission gears. Thus, lower transmission gears may be capable of greater torque multiplication than relatively higher transmission gears. Conversely, for a given transmission input speed, lower transmission gears may be characterized by lower transmission output speeds, and thus higher transmission output torques, than higher transmission gears. Once a transmission gear change has occurred at Step: 134, control may proceed, in a closed-loop manner, to Step: 102.

Alternatively, if the controller 32 determines that the current power source speed is not substantially equal to a limit of the acceptable power source speed range (Step: 128—No), the controller 32 may determine an additional VOS required to satisfy the travel speed request, and the additional VOS may be an estimated variator output speed determined based on operating the power source 12 at either the upper or lower limit of the acceptable power source speed range (Step: 130). The additional VOS determined at Step: 130 may be, for example, a hypothetical VOS corresponding to maximizing power source speed and/or torque output. Alternatively, the additional VOS determined at Step: 130 may be a hypothetical VOS corresponding to minimizing power source speed and/or torque output. It is understood that in embodiments in which the VOS determined at Step: 118 is outside of the acceptable variator speed range on the high side (such as in a positive speed operation), the additional VOS may be determined at Step: 130 using a lower limit of the power source speed range. On the other hand, in embodiments in which the VOS determined at Step: 118 is outside of the acceptable variator speed range on the low side (such as in a negative speed operation), the additional VOS may be determined at Step: 130 using an upper limit of the power source speed range. In exemplary embodiments, control may return to Step: 120 once the hypothetical additional VOS has been determined at Step: 130. In such exemplary embodiments, at Step: 120, the controller 32 may determine whether the additional VOS is within the acceptable variator speed range as described above. Additionally, in such exemplary embodiments, the controller 32 may not actually modify, for example, the output speed and/or output torque of the power source 12 based on the additional VOS determined at Step: 130 before control returns to Step: 120. In such an exemplary embodiment, control may proceed to either Step: 134 or Step: 124 once the additional VOS is compared to the acceptable variator speed range at Step: 120.

Alternatively, as shown in FIG. 5, once the additional VOS has been determined at Step: 130, the controller 32 may operate the power source 12 at the upper or lower limit of the power source speed range (Step: 132). Control may then proceed to Step: 120 where the controller 32 may determine whether the additional VOS is within the acceptable variator speed range. It is understood that in such embodiments, if the controller 32 determines that the additional variator output speed is outside of the acceptable variator speed range (Step: 120—No), the controller 32 may then determine that the current power source speed is substantially equal to the limit of the power source speed range (Step: 128—Yes). Control may then proceed to Step: 134 where the transmission gear may be changed. Once a transmission gear change has occurred at Step: 134, control may proceed, in a closed-loop manner, to Step: 102.

It will be apparent to those skilled in the art that various modifications and variations can be made to the drive systems of the present disclosure. Other embodiments of the drive systems will be apparent to those skilled in the art from consideration of the specification and practice of the drive systems disclosed herein. It is intended that the specification and examples be considered as exemplary only, with a true scope of the disclosure being indicated by the following claims and their equivalents.

What is claimed is:

1. A method of controlling a drive system operably connected to a power source and a transmission of a machine, comprising:
   receiving, at a controller, a machine travel speed request;
   determining, by the controller, an output speed of a variator, associated with the drive system, required to satisfy the travel speed request at a current power source speed;
   determining, by the controller, that a storage device operably connected to the variator has an amount of stored energy sufficient to operate the variator at the variator output speed; and
   providing torque to the transmission with the power source and the variator, wherein the controller further:
      operates the variator at the variator output speed using stored energy from the storage device to provide torque to the transmission,
      determines that the torque provided to the transmission with the power source and the variator is sufficient to satisfy the travel speed request at the current power source speed;
      determines that the variator output speed is within an acceptable variator output speed range,
      determines that the storage device has adequate capacity to store additional energy, and stores excess energy from at least one of the power source and the transmission in the storage device via the variator.

2. The method of claim 1, further including determining a transmission input speed required to satisfy the travel speed request,
determining that the transmission input speed is outside of an acceptable power source speed range, and
determining the variator output speed in response to determining that the transmission input speed is outside of the acceptable power source speed range.

3. The method of claim 1, further including determining a transmission input torque required to satisfy the travel speed request,
determining that the transmission input torque is outside of an acceptable power source torque range, and
determining the variator output speed in response to determining that the transmission input torque is outside of the acceptable power source torque range.

4. The method of claim 1, further including determining that a transmission input speed required to satisfy the travel speed request is within an acceptable power source speed range,
determining that a transmission input torque required to satisfy the travel speed request is within an acceptable power source torque range, and
locking at least two components of a planetary gear set associated with the variator in response to determining that the transmission input speed and transmission input torque are within the power source speed range and power source torque range, respectively.

5. The method of claim 1, further including providing torque to the transmission with the variator in response to determining that the variator output speed is within an acceptable variator output speed range.

6. The method of claim 1, further including determining that that the variator output speed is outside of an acceptable variator output speed range,
determining that the current power source speed is substantially equal to a limit of a power source speed range, and
changing a gear of the transmission in response to determining that the current power source speed is substantially equal to the limit of the power source speed range.

7. The method of claim 1, further including determining that the variator output speed is within an acceptable variator output speed range,
determining that energy stored within the storage device is insufficient to operate the variator at the variator output speed, and
determining whether the current power source speed is substantially equal to a limit of a power source speed range in response to determining that the energy stored within the storage device is insufficient to operate the variator at the variator output speed.

8. The method of claim 7, further including changing a gear of the transmission in response to determining that the current power source speed is substantially equal to the limit of the power source speed range.

9. The method of claim 1, further including determining an additional variator output speed required to satisfy the travel speed request, wherein the additional variator output speed is determined based on a limit of a power source speed range,
determining that the additional variator output speed is outside of an acceptable variator speed range, and
changing a gear of the transmission in response to determining that the additional variator output speed is outside of the acceptable variator speed range.

10. The method of claim 9, further including operating the power source at the power source speed limit.

11. A method of controlling a drive system operably connected to a power source and a transmission of a machine, comprising:
receiving, at a controller, a machine travel speed request;
determining, by the controller, an output speed of a variator, associated with the drive system, required to satisfy the travel speed request at a current power source speed; and
providing torque to the transmission with the power source and the variator, via a planetary gear set of the drive system, wherein
the variator is connected to a sun gear of the planetary gear set and is driven with stored electrical energy to operate at the variator output speed,
the power source is connected to a ring gear of the planetary gear set, and
the torque provided to the transmission with the power source and the variator is sufficient to satisfy the travel speed request at the current power source speed; and
wherein the controller further:
determines that the variator output speed is within an acceptable variator output speed range,
determines that the storage device has adequate capacity to store additional energy, and
stores excess energy from at least one of the power source and the transmission in the storage device via the variator.

12. The method of claim 11, further including determining that that the variator output speed is outside of an acceptable variator output speed range,
determining that the current power source speed is substantially equal to a limit of a power source speed range, and
changing a gear of the transmission in response to determining that that the current power source speed is substantially equal to the limit of the power source speed range.

13. The method of claim 11, further including determining an additional variator output speed required to satisfy the travel speed request, wherein the additional variator output speed is determined based on a limit of a power source speed range,
determining that the additional variator output speed is outside of an acceptable variator speed range, and
changing a gear of the transmission in response to determining that the additional variator output speed is outside of the acceptable variator speed range.

14. The method of claim 11, further including determining that a transmission input speed required to satisfy the travel speed request is within an acceptable power source speed range,
determining that a transmission input torque required to satisfy the travel speed request is within an acceptable power source torque range, and
locking at least two components of the planetary gear set in response to determining that the transmission input speed and transmission input torque are within the power source speed range and power source torque range, respectively.

15. A method of controlling a drive system operably connected to a power source and a transmission of a machine, comprising:
receiving, at a controller, a machine travel speed request;

determining, by the controller, an output speed of a variator, associated with the drive system, required to satisfy the travel speed request at a current power source speed; and providing torque to the transmission with the power source and the variator, via a planetary gear set of the drive system, wherein the variator is connected to a ring gear of the planetary gear set and is driven with stored hydraulic energy to operate at the variator output speed, the power source is connected to a sun gear of the planetary gear set, and the torque provided to the transmission with the power source and the variator is sufficient to satisfy the travel speed request at the current power source speed; and wherein the controller further:

determines that the variator output speed is within an acceptable variator output speed range, determines that the storage device has adequate capacity to store additional energy, and stores excess energy from at least one of the power source and the transmission in the storage device via the variator.

16. The method of claim 15, further including providing pressurized fluid to the variator with a hydraulic system of the machine, wherein the hydraulic system includes a pressure source driven by the power source.

17. The method of claim 15, further including determining that that the variator output speed is outside of an acceptable variator output speed range, determining that the current power source speed is substantially equal to a limit of a power source speed range, and changing a gear of the transmission in response to determining that that the current power source speed is substantially equal to the limit of the power source speed range.

18. The method of claim 15, further including determining an additional variator output speed required to satisfy the travel speed request, wherein the additional variator output speed is determined based on a limit of a power source speed range, determining that the additional variator output speed is outside of an acceptable variator speed range, and changing a gear of the transmission in response to determining that the additional variator output speed is outside of the acceptable variator speed range.

* * * * *